(12) United States Patent
Beccarisi et al.

(10) Patent No.: US 12,375,028 B2
(45) Date of Patent: Jul. 29, 2025

(54) SYSTEM OF PHOTOVOLTAIC SOLAR PANELS

(71) Applicant: Comau S.p.A., Grugliasco (IT)

(72) Inventors: Francesco Beccarisi, Grugliasco (IT); Giovanni Di Stefano, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 0 days.

(21) Appl. No.: 18/272,400

(22) PCT Filed: Jan. 20, 2022

(86) PCT No.: PCT/IB2022/050454
§ 371 (c)(1),
(2) Date: Jul. 14, 2023

(87) PCT Pub. No.: WO2022/157649
PCT Pub. Date: Jul. 28, 2022

(65) Prior Publication Data
US 2024/0079992 A1    Mar. 7, 2024

(30) Foreign Application Priority Data
Jan. 22, 2021   (IT) .................. 102021000001178

(51) Int. Cl.
*H02S 20/32*        (2014.01)
*H02S 30/10*        (2014.01)

(52) U.S. Cl.
CPC .............. *H02S 20/32* (2014.12); *H02S 30/10* (2014.12)

(58) Field of Classification Search
CPC ............................... H02S 20/32; H02S 30/10
See application file for complete search history.

(56) References Cited

U.S. PATENT DOCUMENTS

| | | |
|---|---|---|
| 8,567,134 B1 | 10/2013 | Grushkowitz et al. |
| 11,245,353 B2 | 2/2022 | Di Stefano et al. |
| (Continued) | | |

FOREIGN PATENT DOCUMENTS

| | | |
|---|---|---|
| CL | 2020001237 A1 | 11/2020 |
| CL | 2020003187 A1 | 4/2021 |
| (Continued) | | |

OTHER PUBLICATIONS

U.S. Appl. No. 17/921,738, filed Oct. 27, 2022 entitled: Method And System For Assembling And Installing Arrays Of Photovoltaic Solar Panels In An Outdoor Field.

(Continued)

*Primary Examiner* — Devina Pillay
(74) *Attorney, Agent, or Firm* — Young Basile Hanlon & MacFarlane, P.C.

(57) ABSTRACT

A system of photovoltaic solar panels comprises a plurality of photovoltaic solar panels and a supporting structure provided for supporting the photovoltaic solar panels in a number of rows parallel to one another on the supporting structure. The supporting structure includes a series of cross members arranged parallel to and at a distance apart from one another, configured for blocking a respective side of a photovoltaic solar panel. In one example, each cross member comprises a single piece of sheet metal bent so as to perform the functions of centring, referencing, and blocking said photovoltaic solar panels, without the aid of further fixing or referencing elements.

13 Claims, 10 Drawing Sheets

(56) References Cited

U.S. PATENT DOCUMENTS

| | | | |
|---|---|---|---|
| 2011/0072631 A1 | 3/2011 | Hartelius et al. | |
| 2013/0048056 A1* | 2/2013 | Kilgore | H02S 20/24 |
| | | | 136/251 |
| 2014/0360552 A1 | 12/2014 | Britcher et al. | |
| 2018/0191289 A1* | 7/2018 | Zhu | H02S 20/23 |

FOREIGN PATENT DOCUMENTS

| | | |
|---|---|---|
| DE | 10 2010 038054 A1 | 3/2012 |
| EP | 2356382 B1 | 12/2016 |
| WO | 2014/108196 A1 | 7/2014 |
| WO | 2017161358 A2 | 9/2017 |
| WO | 2019097348 A1 | 5/2019 |
| WO | WO-2019097359 A1 * 5/2019 .............. F24S 25/12 |
| WO | 2019237030 A1 | 12/2019 |
| WO | 2021229387 A2 | 11/2021 |

OTHER PUBLICATIONS

U.S. Appl. No. 18/037,850, filed May 19, 2023 entitled: Method For Outdoor Installation Of An Array Of Solar Converters, And Carriage Used In The Method.

* cited by examiner

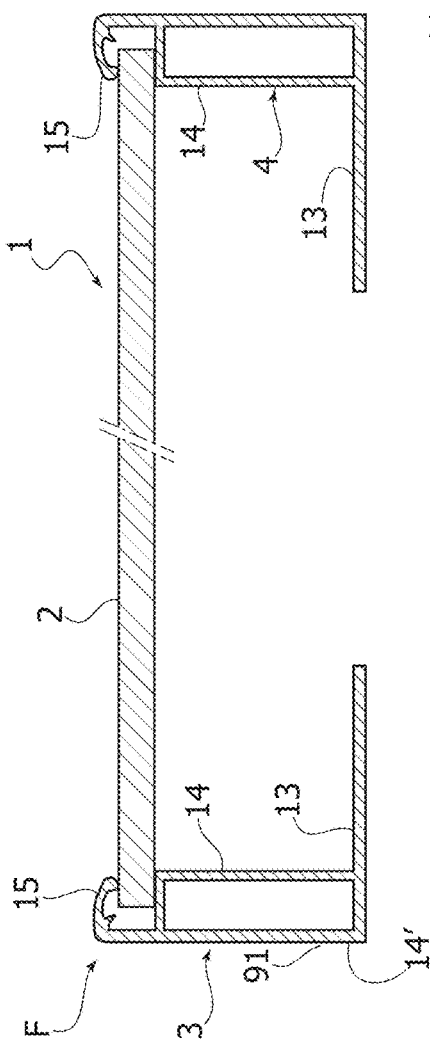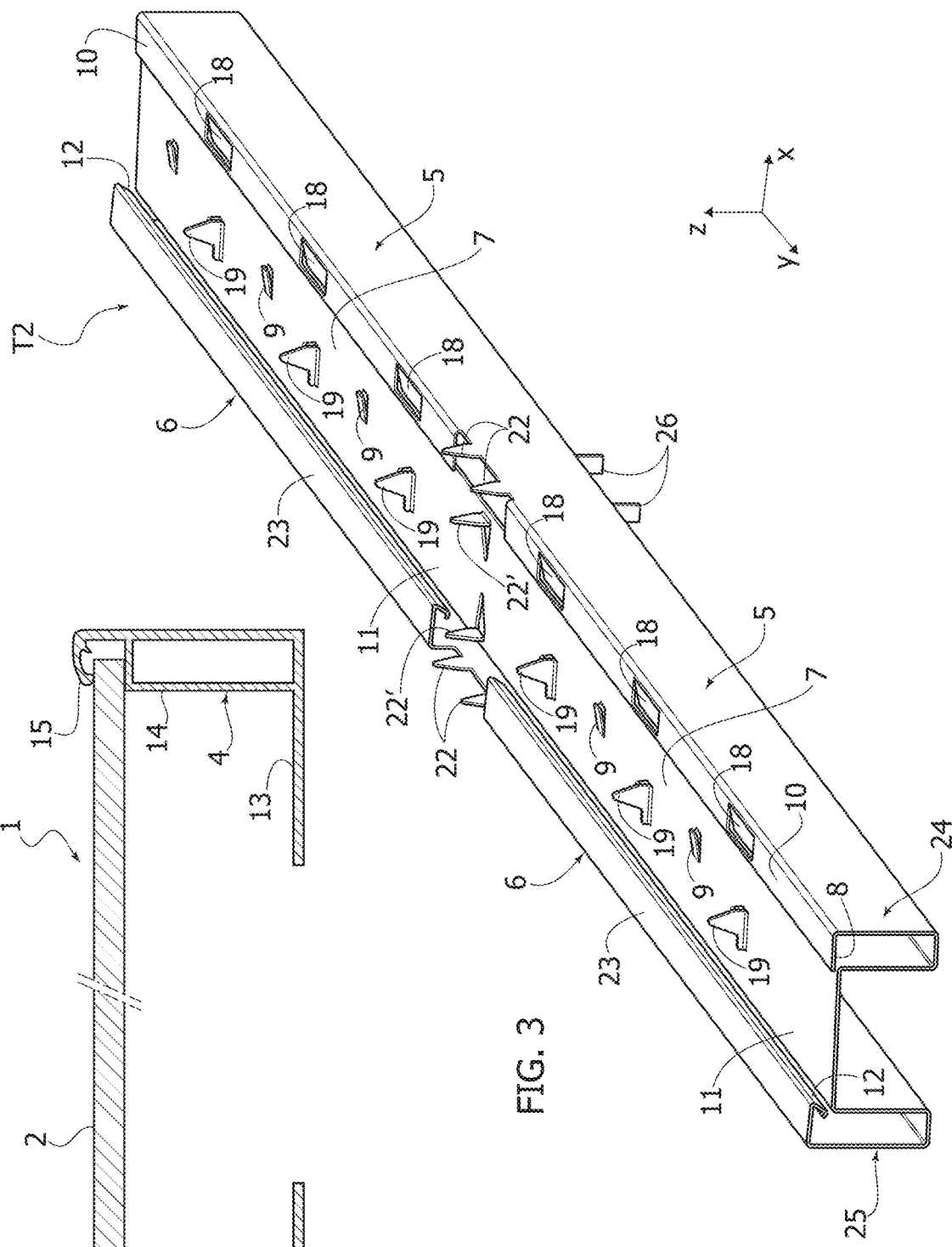

SYSTEM OF PHOTOVOLTAIC SOLAR PANELS

CROSS-REFERENCE TO RELATED APPLICATION(S)

This application is filed pursuant to 35 U.S.C. § 371 claiming priority benefit to PCT/IB2022/050454 filed Jan. 20, 2022, which claims priority benefit to Italian Patent Application No. 102021000001178 filed Jan. 22, 2021, the contents of both applications are incorporated herein by reference in the entirety for all purposes.

TECHNICAL FIELD

The present invention relates to a system of photovoltaic solar panels provided for being mounted on the ground in an open space.

BACKGROUND

An installation system of the type referred to above is, for example, described in the documents EP 2356382 B1 and U.S. Pat. No. 8,567,134 B1.

Up to the present, installation of photovoltaic panels has been chiefly based upon introduction of additional components, such as coupling elements and/or blocking members, which must be installed manually on supporting beams, for example by means of operations of bolting or riveting. Consequently, the structures that support and block the panels are not optimized to obtain a total automation of the procedures of installation of the panels in so far as they require supervision and manual intervention during some steps of the assembly process. All this results in an increase in terms of costs and time required for implementation of the system of solar panels. The present invention hence stems from the desire to overcome these drawbacks.

SUMMARY

The object of the present invention is to propose a system of photovoltaic solar panels that will render the operations of installation of the panels extremely simple and fast.

A further object of the invention is to provide a corresponding method of installation that will be altogether easy to automate, as well as to control from a remote-control station.

A further object of the invention is to propose a system of connection of the panels that will be simple to produce and will ensure high structural strength, moreover guaranteeing a total stability of the panels on a supporting structure mounted on the ground.

A further object of the invention is to provide a low-cost and high-efficiency system of photovoltaic solar panels.

With a view to providing one or more of the aforesaid objects, the subject of the invention is a system of photovoltaic solar panels provided for being mounted on the ground in an open space, comprising:
  a plurality of photovoltaic solar panels and a supporting structure provided for supporting said plurality of photovoltaic solar panels, in particular in a number of rows parallel to one another on the supporting structure,
  said supporting structure including a series of cross members arranged parallel to and at a distance apart from one another, configured for blocking a respective side of a photovoltaic solar panel,
  wherein each cross member comprises a single piece of sheet metal bent so as to provide the functions of centring, referencing, and blocking said photovoltaic solar panels, without the aid of further fixing or referencing elements.

According to further characteristics of the invention, the photovoltaic solar panels each include a frame comprising a first frame portion and a second frame portion mounted along a first side and a second side of a photovoltaic layer, respectively,
  said series of cross members comprising a first cross member provided for blocking said first portion of the frame of a panel, wherein said first cross member comprises:
  a main supporting wall substantially parallel to the photovoltaic layer, provided for receiving and supporting said first portion of the frame of a panel;
  an end portion provided for receiving an end of said first portion of the frame; and
  at least one elastic blocking tooth, obtained on said main wall and set at a distance from said end portion, the elastic blocking tooth being set in a raised position in the condition where the panel is installed on the supporting structure, wherein the elastic tooth has a main face oblique with respect to the main supporting wall, a first end connected to said main wall, and a second end that is free,
  said second, free, end acting as element of contrast against a side of said first portion of the frame in such a way that said first portion of the frame rests on said main wall and is blocked between said end portion and said elastic blocking tooth,
  in such a way that said photovoltaic solar panel is constrained, along said first side, to said first cross member.

In the present description and in the ensuing claims, by the expression "supporting structure" for a photovoltaic solar panel is meant any structure provided on the ground that is to receive and support the photovoltaic solar panels. Typically, this structure is constituted by the mobile part of a tracking device, or tracker, of any known type, which is able to orient the photovoltaic solar panels during the day in such a way as to track the apparent motion of the Sun.

The subject of the invention is also a method for installing a series of photovoltaic solar panels according to the system referred to above.

BRIEF DESCRIPTION OF THE DRAWINGS

Further characteristics and advantages of the invention will emerge from the ensuing description with reference to the annexed drawings, which are provided purely by way of non-limiting example and in which:

FIG. 2 is a schematic cross-sectional view of a photovoltaic solar panel that can be mounted on a supporting structure, according to the system of the invention;

FIGS. 3 and 4 illustrate a preferred embodiment of a cross member of the supporting structure, according to a schematic perspective view and a cross-sectional view, respectively;

DETAILED DESCRIPTION

In the ensuing description, various specific details are illustrated aimed at enabling an in-depth understanding of examples of one or more embodiments. The embodiments may be provided without one or more of the specific details, or with other methods, components, materials, etc. In other cases, known structures, materials, or operations are not illustrated or described in detail so that various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be combined in any adequate way in one or more embodiments and/or associated to the embodiments in a way different from what is illustrated herein, so that, for example, a characteristic exemplified herein in relation to a figure may be applied to one or more embodiments exemplified in a different figure.

The references used herein are provided merely for convenience and hence do not limit the sphere of protection or the scope of the embodiments.

Figure 1:
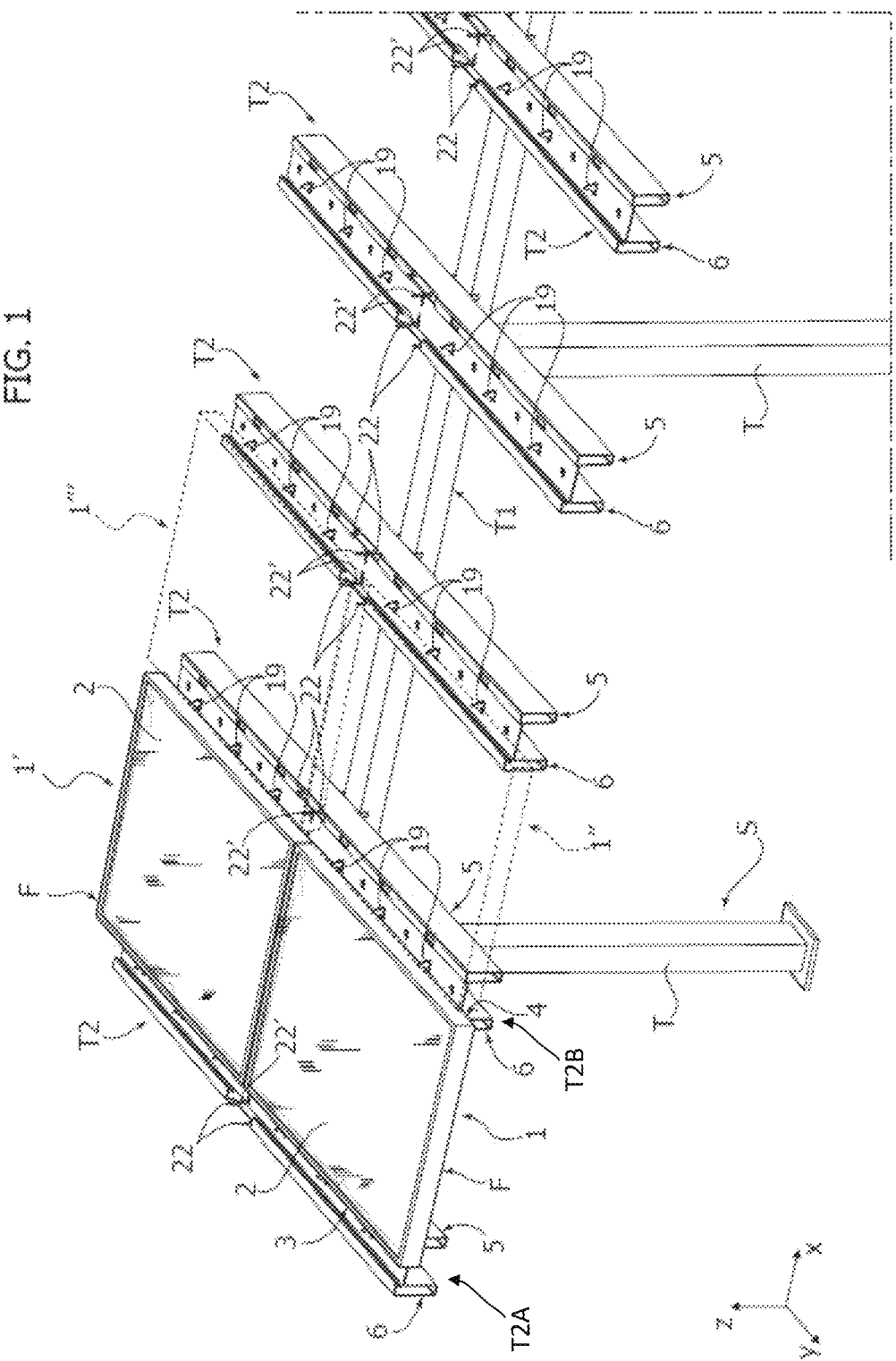
FIG. 1 is a perspective view of a system of photovoltaic solar panels according to a preferred embodiment of the invention.

FIG. 1 shows a perspective view of a system of photovoltaic solar panels provided for being mounted on the ground in an open space, in conformance with the present invention.

The reference number 1 designates a photovoltaic solar panel forming part of an array of photovoltaic solar panels mounted on a supporting structure S. According to the most common solution, such an array comprises two rows of panels set alongside one another.

As already mentioned above, in the present description and in the ensuing claims, by the expression "supporting structure" for a photovoltaic solar panel is meant any structure provided for the above purpose on the ground out in the open. Typically, the aforesaid structure S is constituted by the mobile part of a tracker, obtained in any known way, that is to enable orientation of the photovoltaic solar panels in the course of the day so as to track the apparent motion of the Sun.

In the case of the embodiment illustrated in FIG. 1, the supporting structure S of the photovoltaic solar panels 1, includes a series of vertical supports T, rigidly connected to which is at least one substantially horizontal top beam T1. The vertical supports T are supporting uprights driven into the ground, which support the top beam T1 by means of jointing devices of any known type, which include means for enabling rotation of the top beam T1 about its longitudinal axis in order to obtain the movement of solar tracking of the photovoltaic solar panels 1 that are to be carried by the structure S. All the aforesaid elements may be made of metal material, for example steel.

The supporting structure S includes a series of cross members 5, 6 rigidly connected to the top beam T1. As described in greater detail in the sequel of the disclosure, the cross members 5, 6 are configured for blocking the photovoltaic solar panels 1 on the supporting structure S. The array of panels comprises two rows set alongside one another mounted on the supporting structure S. The cross members 5, 6 are arranged in a transverse direction with respect to the longitudinal extension of the top beam T1 and are set parallel to, and at a distance apart from, one another. The cross members 5, 6 may be connected to the top beam T1 by means of connection members described in the sequel of the description. Just as the vertical supports T and the top beam T1, also the cross members 5, 6 may be made of metal material, for example steel.

Each photovoltaic solar panel 1 has a photovoltaic layer 2 with quadrilateral configuration. As illustrated, in particular, in FIG. 2, which is a schematic cross-sectional view of a panel 1, each photovoltaic solar panel 1 includes a peripheral frame F having a first portion 3 mounted along a first side of the panel 1, and a second portion 4 mounted along a second side of the panel 1 opposite to the first side. The portions 3 and 4 of the frame F are symmetrical with respect to the centre line of the panel 1.

The aforesaid first and second portions 3 and 4 of the frame F have, respectively, a top portion defining a seat 15 configured for receiving a respective edge of the photovoltaic layer 2, and a vertical wall 14 extending downwards from the top portion. Extending at the bottom end of the vertical wall 14 is a base wall 13, which is set parallel to, and at a distance from, the photovoltaic layer 2 and functions as a flange for connection to the supporting structure S, in particular to a respective cross member 5, 6.

According to the invention, each cross member 5, 6 comprises a single piece of sheet metal bent so as to perform the functions of centring, referencing, and blocking of the photovoltaic solar panels, without the aid of further fixing or referencing elements (such as additional rivets or other types of fixing members).

According to an advantageous embodiment illustrated in the drawings, the aforesaid first and second cross members 5, 6 are portions set alongside one another of a single cross member T2, thus defining a first cross-member part T2, which is to withhold a first side of a first solar panel, and a second cross-member part T2, which is to withhold a second side of a second solar panel, in such a way that said first side and said second side are adjacent to one another. Consequently, the supporting structure S may comprise a series of cross members T2 so as to be able to provide a continuous photovoltaic layer. As illustrated in FIG. 1, in the final installed configuration, each solar panel 1 is mounted at a first side thereof on a first cross member T2 (in particular, by mounting the first portion 3 of the frame F on the portion 5 of the first cross member T2), and at a second side thereof on a second cross member T2 (in particular, by mounting the second portion 4 of the frame F on the portion 6 of the second cross member T2).

Described in detail in the sequel of the description are the cross members 5, 6 of the supporting structure S, configured for providing connection of the photovoltaic solar panels 1 to the supporting structure S. As mentioned above, these first and second cross members 5, 6 may be portions set alongside one another of a single cross member T2. In any case, for greater convenience of treatment, in what follows reference will be made to a "first cross member 5", and a "second cross member 6". For convenience and clarity of description, two single cross members T2 will be referred to as alpha cross member T2A and beta cross member T2B (see FIGS. 1, 4, and 6A-6C).

Figure 4:
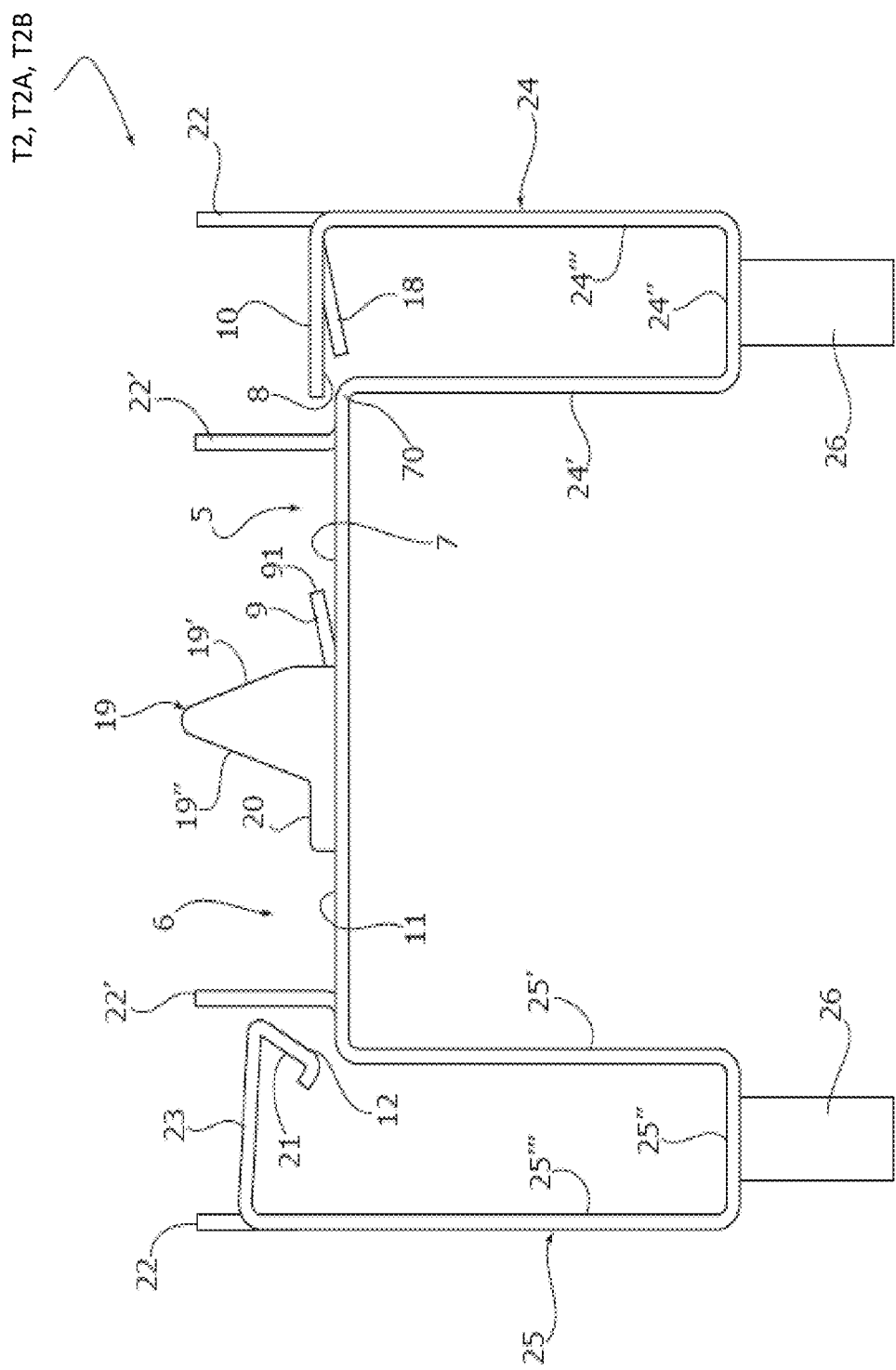

FIGS. 3 and 4 are a perspective view and a schematic cross-sectional view, respectively, that show a first cross member 5 forming part of the system according to a preferred embodiment of the invention. As mentioned previously, the first cross member 5 is configured for receiving and blocking a first side of a single panel 1, in particular a first portion 3 of the frame F.

The first cross member 5 includes a main supporting wall 7 substantially parallel, in the installed configuration, to the photovoltaic layer 2 of the panel 1. The main supporting wall 7 is configured for receiving and supporting the first portion 3 of the frame F, more in particular the base wall 13 of the first portion 3 of frame F.

An end portion 8 is set in the proximity of an end 70 of the main wall 7. This end portion 8 is configured for receiving an end of the first portion 3 of the frame F, more in particular a terminal portion of the base wall 13 of the first portion 3 of the frame F. Preferably, the end portion 8 is an end recess 8 defined by a space between the main wall 7 and a horizontal end wall 10 substantially parallel to and vertically spaced at a distance from the main wall 7 (FIGS. 3 and 4).

Preferentially, made along the aforesaid horizontal end wall 10 are a series of slots provided for obtaining a respective inclined portion 18 of the horizontal wall 10. The inclined portions 18 are provided for receiving a terminal edge of the base wall 13 of the frame F of the panel 1 so as to increase the friction between the frame F and the end recess 8. As illustrated in the annexed drawings, the inclined portions 18 are set at a distance apart from one another and aligned with one another, in the main direction of the first cross member 5. The inclined portions 18 may be obtained by shearing on the horizontal end wall 10 and have an inclined surface so as to be able to position, in the final configuration, a terminal portion of the base wall 13 of the first portion 3 of the frame F between the horizontal wall 10 and the aforesaid inclined surface (FIG. 10A).

Figure 10A:
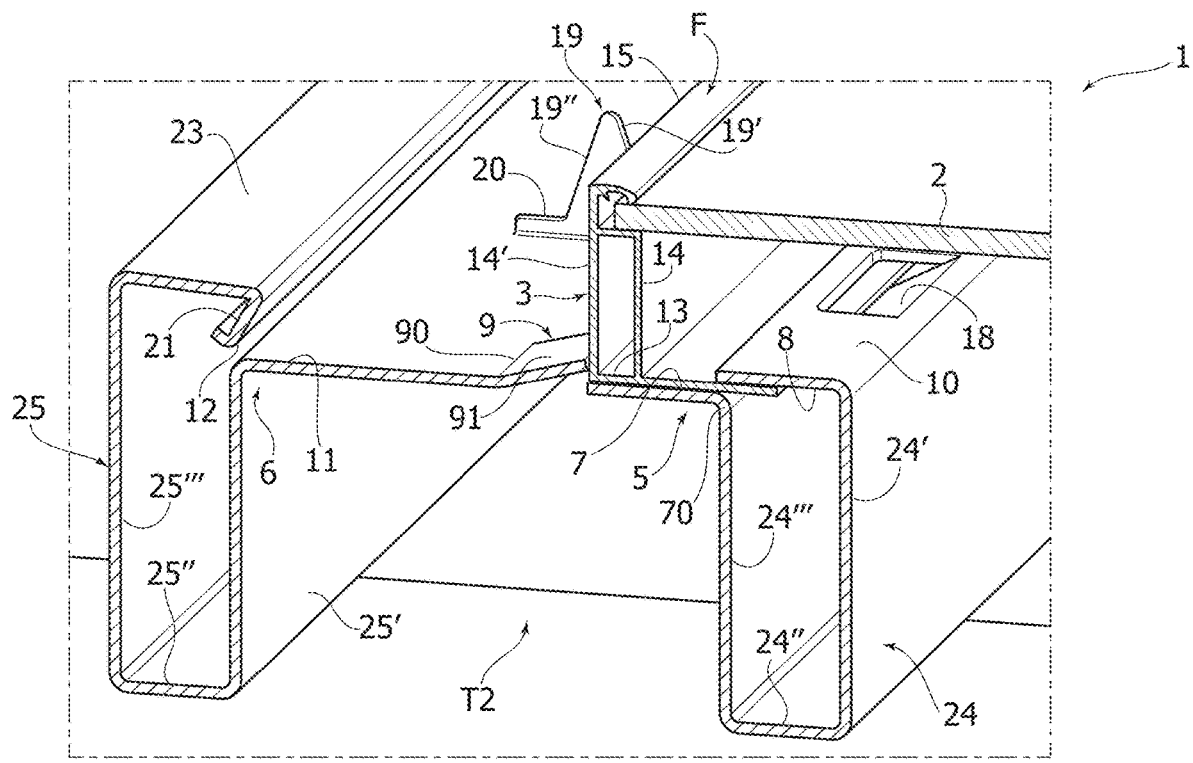
FIGS. 10A-10B are views at an enlarged scale that illustrate two opposite sides of a solar panel stably mounted on a supporting structure, according to the system of the invention.

According to an important characteristic of the present invention, provided on the main wall 7, at a certain distance from the end recess 8, is an elastic blocking tooth 9 (FIGS. 3-5A, 10A). With reference to FIG. 10A, in the final condition where the solar panel 1 is mounted on the first cross member 5, the elastic tooth 9 is set in a raised position in such a way that its main face 9' is oblique with respect to the main wall 7 of the cross member 5. In this raised position, a first end 90 of the tooth 9 is connected to the main wall 7 and a second end 91 acts as a contrast element against a side of the first portion 3 of the frame F, in particular against an outer face 14' of the vertical wall 14. Preferably, the elastic blocking tooth 9 is obtained by shearing on the main wall 7 and has a quadrangular shape. Once again according to a preferred characteristic, in the raised position, the elastic blocking tooth 9 forms an angle of approximately 45° with respect to the main wall 7 of the cross member 5.

By virtue of the foregoing, it will hence be appreciated that in the mounted configuration, a side of the panel 1, in particular the first portion 3 of the frame F, is set and blocked between the end recess 8 and the elastic blocking tooth 9 in its raised position (FIG. 10A).

As described in detail in the sequel of the description, the elastic blocking tooth 9 is configured for being lowered against the main wall 7 of the cross member 5, during a step of the procedure of installation of the solar panels 1 on the supporting structure S. This installation procedure is extremely simple and fast, in addition to being totally automated and easily controllable from a remote-control station.

To optimize the effectiveness of the coupling between the solar panels 1 and the supporting structure S, the first cross members 5 may include at least two elastic blocking teeth 9, arranged aligned to one another and set at a distance apart from one another along the main extension of the first cross member 5. Preferably, the end recess 8 is formed along the entire extension of the first cross member 5. The above characteristics are illustrated, in particular, in the perspective view of FIG. 3.

As mentioned previously, a second cross member 6 is configured for receiving a second side of a panel 1, in particular a second portion 4 of the frame F, opposite to the first portion 3 thereof, which is coupled to a first cross member 5 that includes the elastic tooth 9.

In one or more embodiments, as in the one illustrated in FIGS. 3 and 4, the second cross member 6 includes a main supporting wall 11 configured for receiving and supporting the base wall 13 of the second portion 4 of the frame F of the panel 1. At one end of the main wall 11, the second cross member 6 includes an end seat 12 provided for receiving an end portion of said second portion 4 of the frame F. The main supporting wall 11 and the end seat 12 are configured for receiving and blocking the second portion 4 of the frame F of the panel 1.

In one or more embodiments, as in the one illustrated in FIGS. 3 and 4, the end seat 12 is defined by the space between an arm 21 and the main wall 11. The arm 21 is connected to a substantially horizontal wall 23 that is vertically set at a distance from the main wall 11 in such a way that the arm 21 extends above the main supporting wall 11. Preferably, the arm 21 is a folding arm configured for folding during installation of the panel 1, along its second side, on said second cross member 6 (FIG. 8B). As described hereinafter in regard to the method of installation of the panels, advantageously the substantially horizontal wall 23 is vertically set apart from the plane of the main supporting walls 7, 11 at a distance greater than the distance between the horizontal end wall 10 and the plane of the main supporting walls 7, 11 (FIGS. 4, 6A-6C).

It will be hence appreciated that, according to the system of the invention, the photovoltaic solar panel 1 is blocked, in particular along a first side thereof and a second side thereof opposite to the first side, respectively to a first cross member 5 and to a second cross member 6, as described previously.

According to an advantageous embodiment illustrated in the annexed drawings, the aforesaid first and second cross members 5, 6 are portions set alongside one another of a single cross member T2, thus obtaining a first cross-member part T2 (in accordance with what has been described for the cross member 5) that is to withhold a first side of a first solar panel, and a second cross-member part T2 (in accordance with what has been described for the cross member 6) that is to withhold a second side of a second solar panel. Thanks also to this characteristic, the system according to the invention forms one or more rows of photovoltaic solar panels 1 adjacent to one another, supported on the cross members T2 of the supporting structure S (FIG. 1).

FIGS. 3 and 4 are, respectively, a schematic cross-sectional view and a perspective view at an enlarged scale that illustrate the aforesaid configuration with single cross member T2. The cross member T2 comprises a first portion corresponding to the aforesaid first cross member 5 and a second portion, set alongside the first portion, corresponding to the aforesaid second cross member 6.

The two cross-member portions T2, which are each to withhold one side of a respective panel, are divided by at least one central element 19, projecting vertically from the main wall 7, 11. Preferentially, the single cross member T2 comprises a plurality of central projecting elements 19, arranged at a distance apart from, and aligned with, one another along the main extension of the cross member T2 (FIG. 3).

For greater clarity, with detailed reference to the perspective view of FIG. 1, which illustrates a series of cross members T2, if we observe a cross member T2 and proceed from left to right, the configuration will be as follows: one cross member T2 comprises a second portion 6 that is to withhold one side of a first panel 1, and a first portion 5 with elastic tooth 9 that is to withhold one side of a second panel 1". The first and second portions 5, 6 of the cross member T2 are divided by a series of central elements 19, as mentioned previously. At a certain distance, a further cross member T2 comprises a second portion 6 that is to withhold an opposite side of the second panel 1", and a first portion 5 with elastic tooth 9 that is to withhold one side of a third panel. As mentioned previously, the array of panels comprises two rows of panels set alongside one another mounted on the cross members T2.

Of course, the details of construction of the embodiments described previously may vary widely. This applies both to the conformation and number of the elastic blocking teeth 9 and to the conformation of the end recess 8 of the end seat 12 and of the central projecting element 19. In general, what should be envisaged is that the frame F of the solar panel 1 and the cross members 5, 6, T2 should be provided with mutually engaging elements to perform the functions of centring and blocking of the panel 1 in the horizontal plane. Moreover, in the case of configuration with single cross member T2 with double portion 5, 6, the cross members T2, instead of being made of a single piece, could simply envisage two cross members 5, 6 arranged in contact with one another so as to obtain the aforesaid configuration with single cross member T2.

In one or more embodiments, as in the one illustrated in FIGS. 3-10B, each central projecting element 19 has a substantially triangular conformation defining a first inclined guiding surface 19', for guiding the panel 1 during a step of approach to its final position corresponding (along said first side of the panel 1) to a configuration where it is blocked between said end recess 8 and said elastic blocking tooth 9. The central projecting element 19 has a second inclined guiding surface 19", for guiding the panel 1 during a step of approach to its final position corresponding (along said second side of the panel 1) to a configuration where it is blocked between said central projecting element 19 and said end seat 12.

Figure 9A:
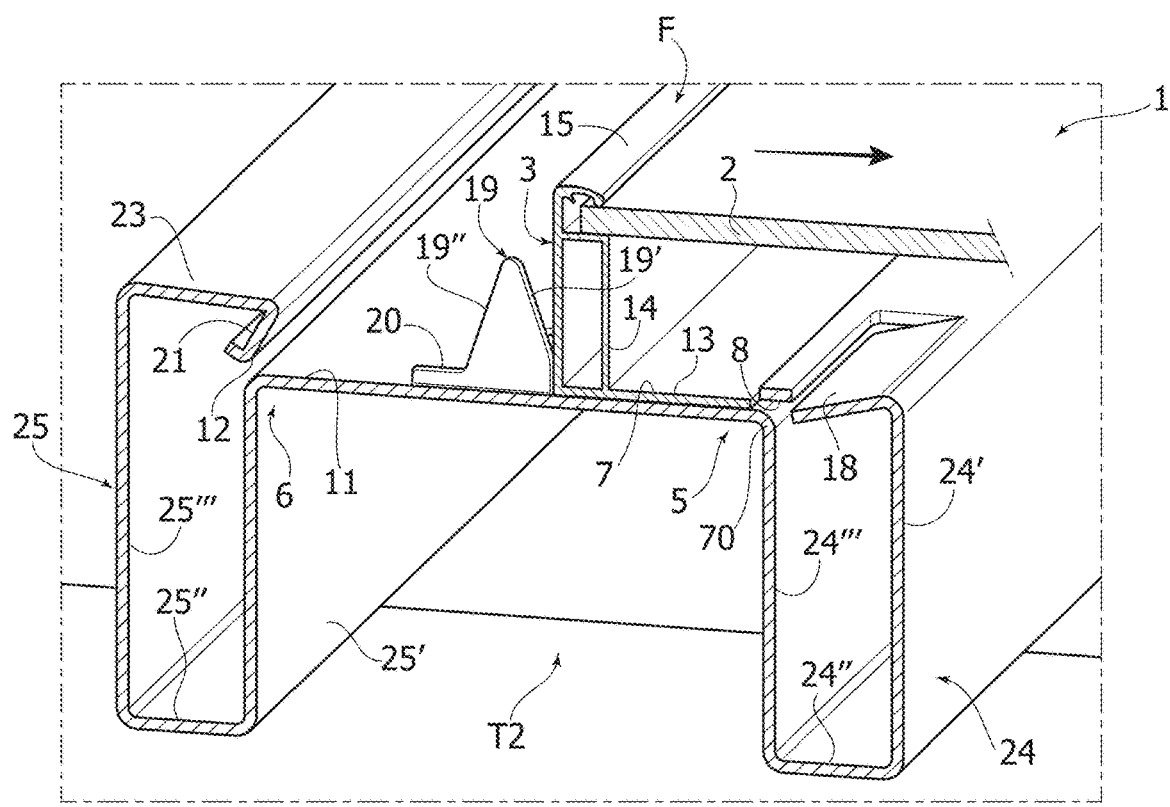
Figure 9B:
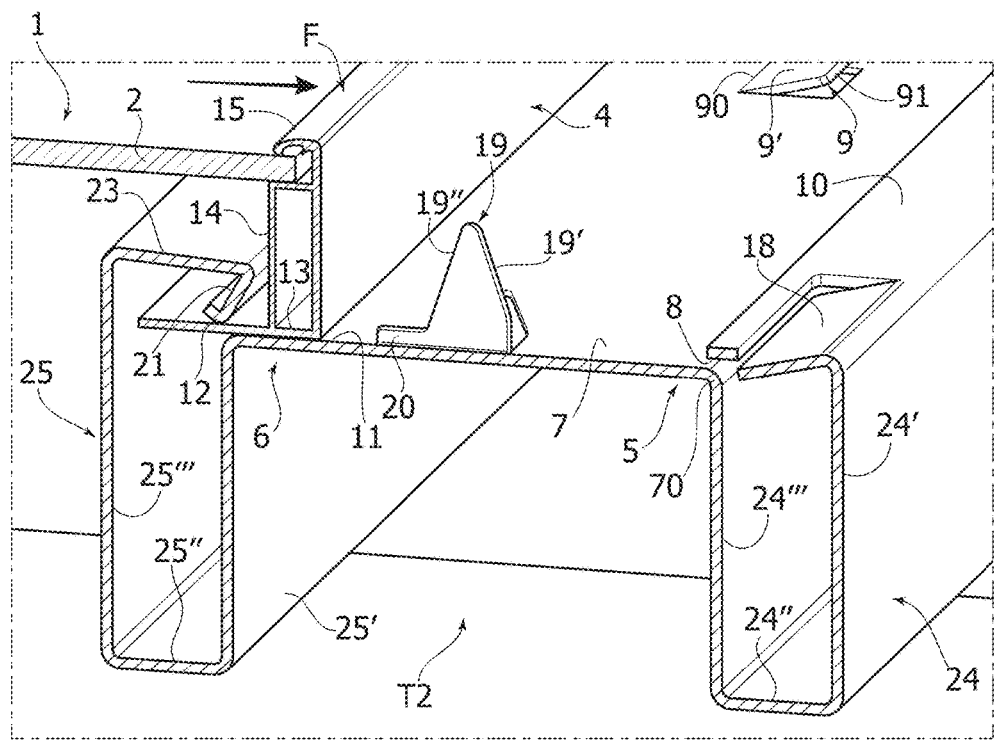
Figure 10B:
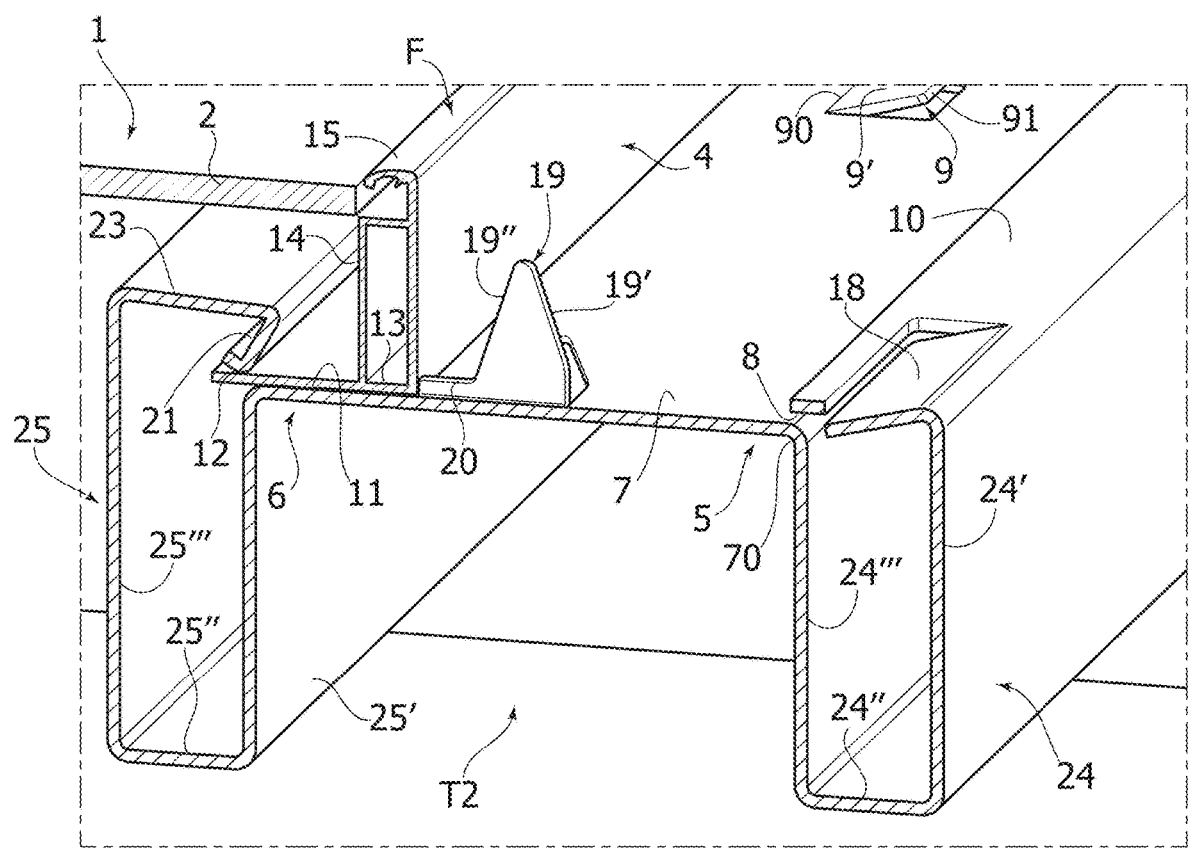

In one or more embodiments, as in the one illustrated in FIGS. 3-10B, each central projecting element 19 comprises a base step 20, adjacent to the main supporting wall 11, at the end of said second inclined surface 19" in such a way that, in the final configuration where the panel is installed, said second side of the panel 1 is blocked between said base step 10 and said end seat 12 (FIG. 10B).

As illustrated in FIGS. 3 and 4, each cross member T2 comprises, on the opposite ends, a respective box-like portion 24, 25 so as to increase the overall strength of the cross member T2 and of the system as a whole. Each box-like portion 24, 25 is defined by an inner vertical wall 24' 25' joined, at a top end, to the respective main wall 7, 11 and, at a bottom end, to a horizontal base wall 24", 25" provided for connection to a portion of the top beam T1 described previously and illustrated in FIG. 1. Each box-like portion 24, 25 is moreover defined by an outer vertical wall 24''', 25''' joined, at a bottom end, to the respective horizontal base wall 24", 25" and, at a top end, respectively to the horizontal end wall 10 and to the substantially horizontal wall 23 that carries the arm 12. The horizontal base walls 24", 25" comprise, respectively, at least one pin 26 vertically projecting from the horizontal base walls 24", 25" to enable installation of the structure S on the beams T1.

Figure 5A:
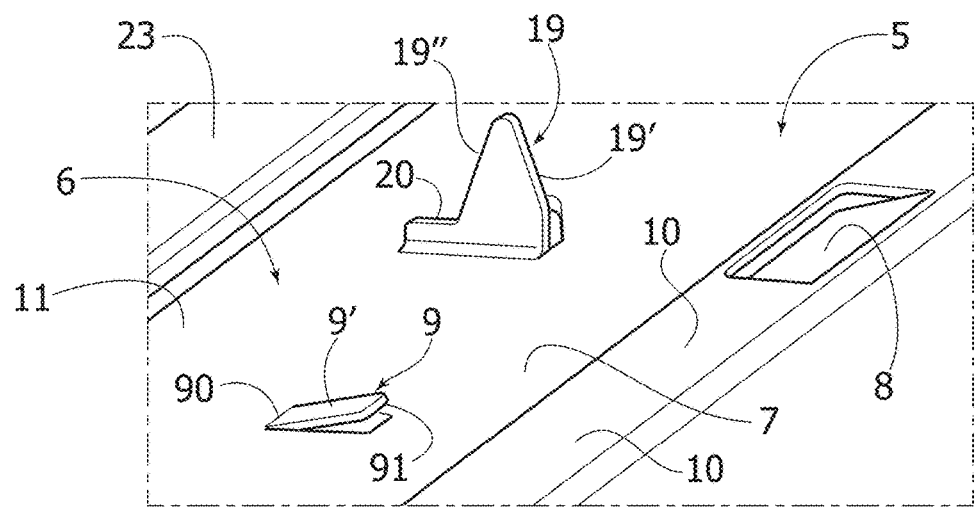
FIGS. 5A and 5B are views at an enlarged scale of some details of FIGS. 3 and 4.
Figure 5B:
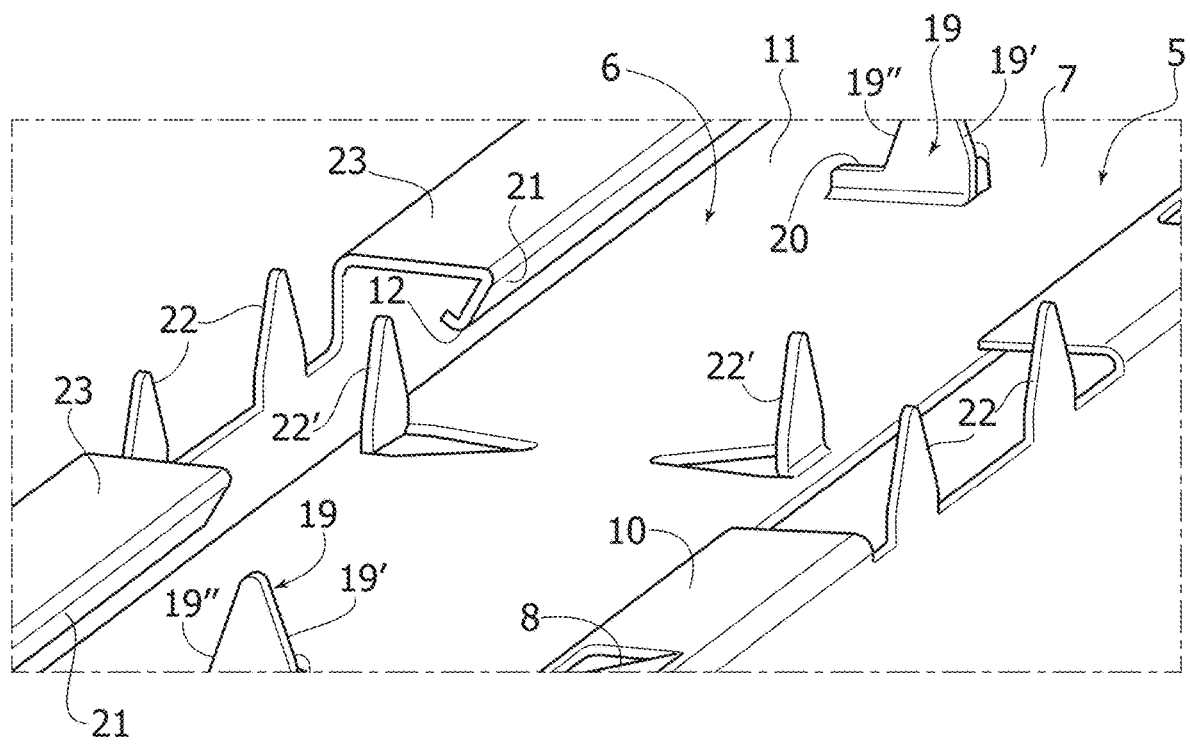

In one or more embodiments, as in the one illustrated in FIGS. 3, 4, and 5B, each cross member T2 comprises a plurality of auxiliary contrast members 22, 22', provided for guiding, during installation, and blocking the panels on the structure S along the main or longitudinal extension of the cross members T2.

More in particular, the auxiliary contrast members 22, 22' are configured for blocking one side of a first panel, perpendicular to the frame portions 3 and 4, so as to prevent a movement of the panel along the main or longitudinal extension of the cross members T2 (direction y). Preferably, the auxiliary contrast members 22, 22' are pins vertically projecting from the cross members T2. According to what is illustrated in the drawings, the members 22, 22' may have a triangular shape so as to define inclined guiding surfaces for guiding the panels, during installation, between the aforesaid members 22, 22'.

Preferably, set on each portion 5, 6 of the cross member T2 is a respective set of auxiliary contrast members 22, 22' symmetrical with respect to one another. Each set may comprise a triangular arrangement, including a first member 22 and a second member 22 set at a distance from one another along the edge of the respective cross member 5, 6, and a member 22', which is more central with respect to the aforesaid first and second members 22, obtained on the respective main wall 7, 11 between the first and second members 22 with reference to the longitudinal axis of the cross members T2. In the final installed configuration, a set of auxiliary contrast members 22, 22' blocks, along the longitudinal axis of the cross members T2, two panels set alongside one another with respective sides (perpendicular to the cross members T2) adjacent to one another. More in particular, a first panel is blocked on a pair of cross members T2 between said first member 22 and said more central member 22', and a second panel is blocked on the same pair of cross members between said member 22' and said second member 22. FIG. 7B' is a further perspective view of the panel 1, viewed from the side of the second portion 4 of frame F, where it may be seen that the panel 1 is blocked (along a side perpendicular to the portions 3 and 4 of frame F) between the aforesaid auxiliary contrast members 22, 22', which are provided for blocking the panels on the structure S along the longitudinal extension of the cross members T2.

As mentioned previously, in the condition where the photovoltaic solar panel 1 is mounted on the first cross member 5, the elastic tooth 9 is set in a raised position in such a way that its main face 90 is oblique with respect to the main wall 7 of the cross member 5. In this raised position, a first end 90 of the tooth 9 is connected to the main wall 7 and a second end 91 acts as contrast element against a side of the first portion 3 of the frame F, in particular against an outer face 14' of the vertical wall 14.

The elastic blocking teeth 9 are configured for being lowered against the main walls 7, during a step of the procedure of installation of the photovoltaic solar panels 1 on the supporting structure S. In all the embodiments described above, it is envisaged that, following upon blocking of a photovoltaic solar panel on the cross members 5, 6, T2, the elastic blocking teeth 9 can be brought back into the respective lowered positions to remove the photovoltaic solar panels 1, for example for carrying out maintenance operations or for replacement thereof.

The installation system described above is pre-arranged for executing the operations of installation in an automated way.

Consequently, in a preferred embodiment, each photovoltaic solar panel 1 may be installed by means of a manipulator robot. Preferably, the manipulator robot is carried by a vehicle, provided on board which are the photovoltaic solar panels 1 to be installed. Once again preferably the vehicle is a vehicle of the AGV (Automated Guided Vehicle) type.

In a typical configuration of the system according to the invention, a number of supporting structures S are provided, arranged in parallel rows and set apart from one another in such a way that the automated vehicle can proceed along the corridors between the rows of the structures S.

FIGS. 6A-10B show some steps of the method of installation of a photovoltaic solar panel 1 on the supporting structure S. In these figures, the cross members 5, 6 are illustrated according to the embodiment with a cross member T2 configured or formed as a single or one piece cross member, which along with additional cross members T2 and solar panels 1 (not shown in these figures), are used to form a continuous, or substantially continuous, row of photovoltaic layers 2.

Of course, the steps of the method as indicated hereinafter may be applied also to other types of cross members that include the principles that underlie the present invention.

As mentioned previously, a first portion 3 of frame F set along a first side of the panel 1 is to be mounted on a portion 5 of a first or alpha cross member T2A that includes the elastic blocking tooth 9, while a second portion 4 of the frame F is to be mounted on a second or beta cross member T2B, at a portion 6 thereof with end seat 12.

Figure 6A:
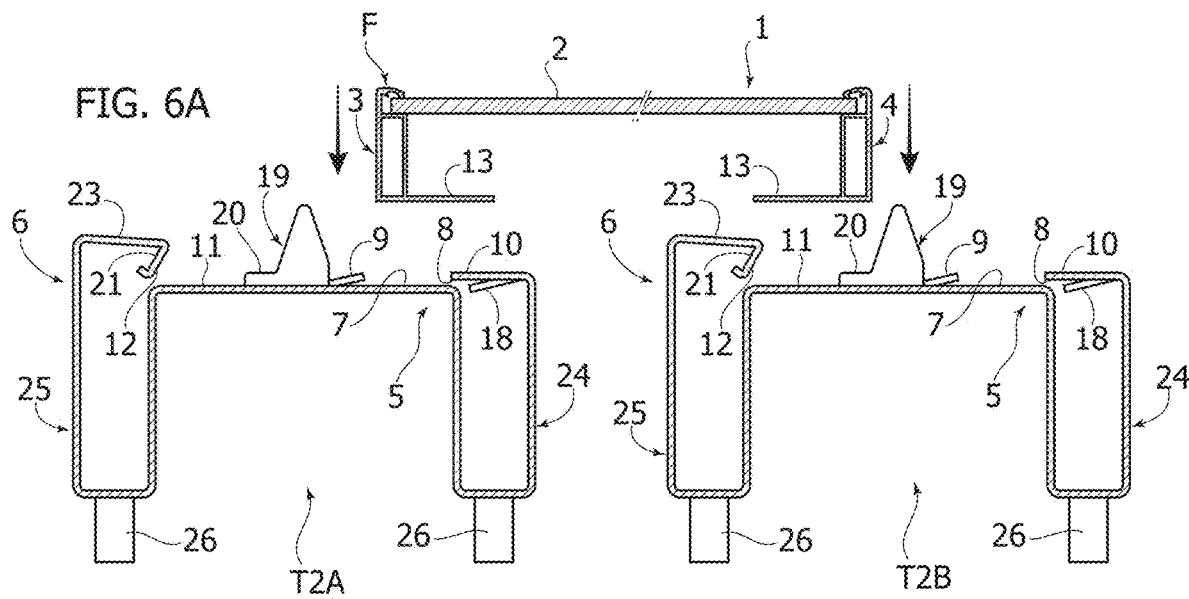
FIGS. 6A-9B illustrate some steps of a method of installation of a solar panel according to the present invention.
Figure 6B:
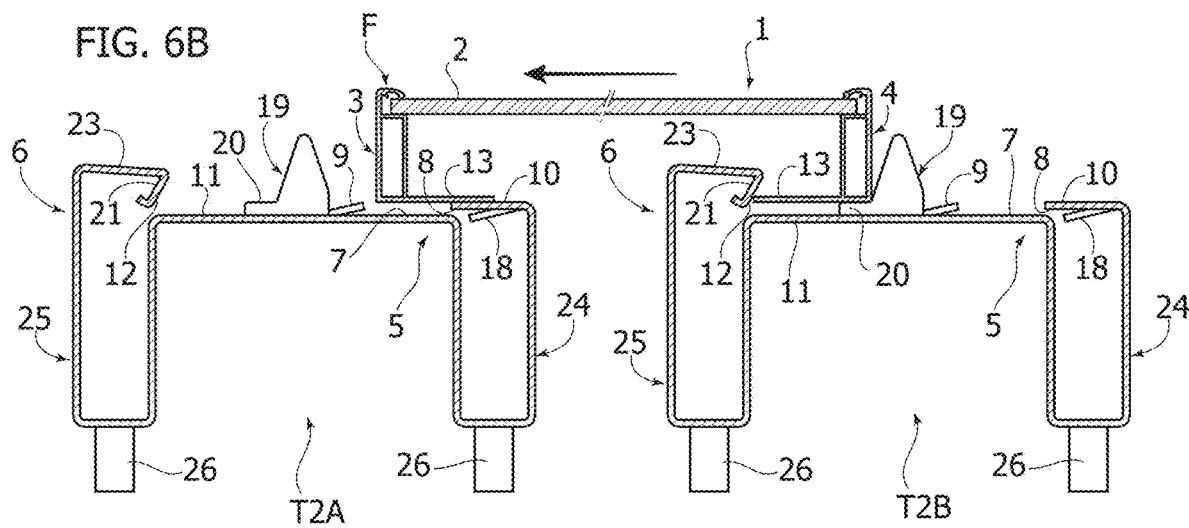
Figure 6C:
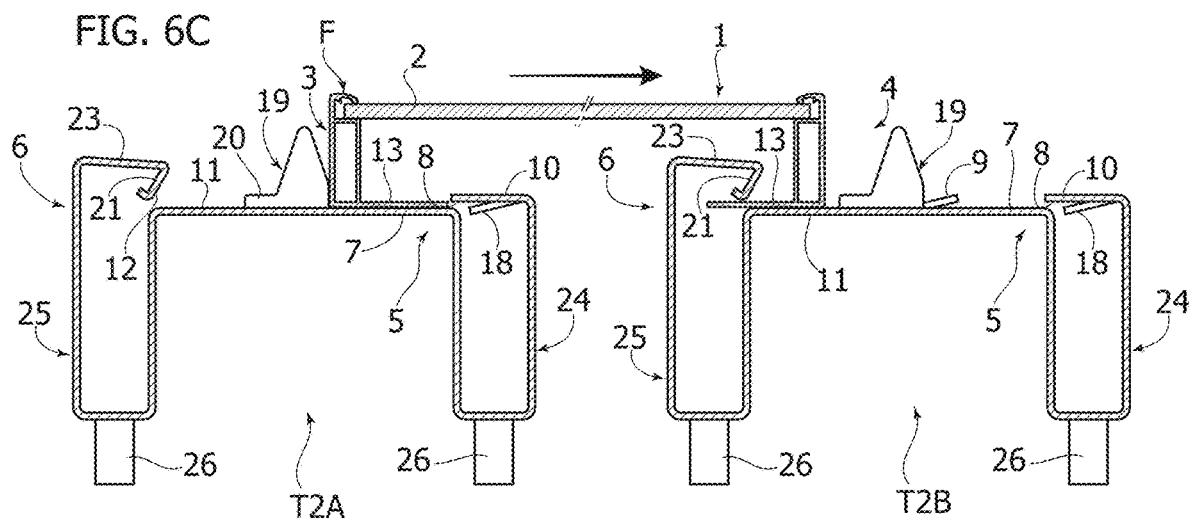

FIGS. 6A-6C are schematic views that illustrate the main steps of the method of installation of both of the portions 3 and 4 of the frame F of a panel 1.

FIGS. 7A, 8A, 9A, 10A are views at an enlarged scale that illustrate the first portion 3 of frame F associated to the portion 5 of a first cross member T2 with elastic tooth 9, whereas FIGS. 7B, 7B', 8B, 9B, and 10B are views at an enlarged scale that illustrate the second portion 4 of frame F associated to the portion 6 of a second cross member T2 with end seat 12.

Figure 7A:
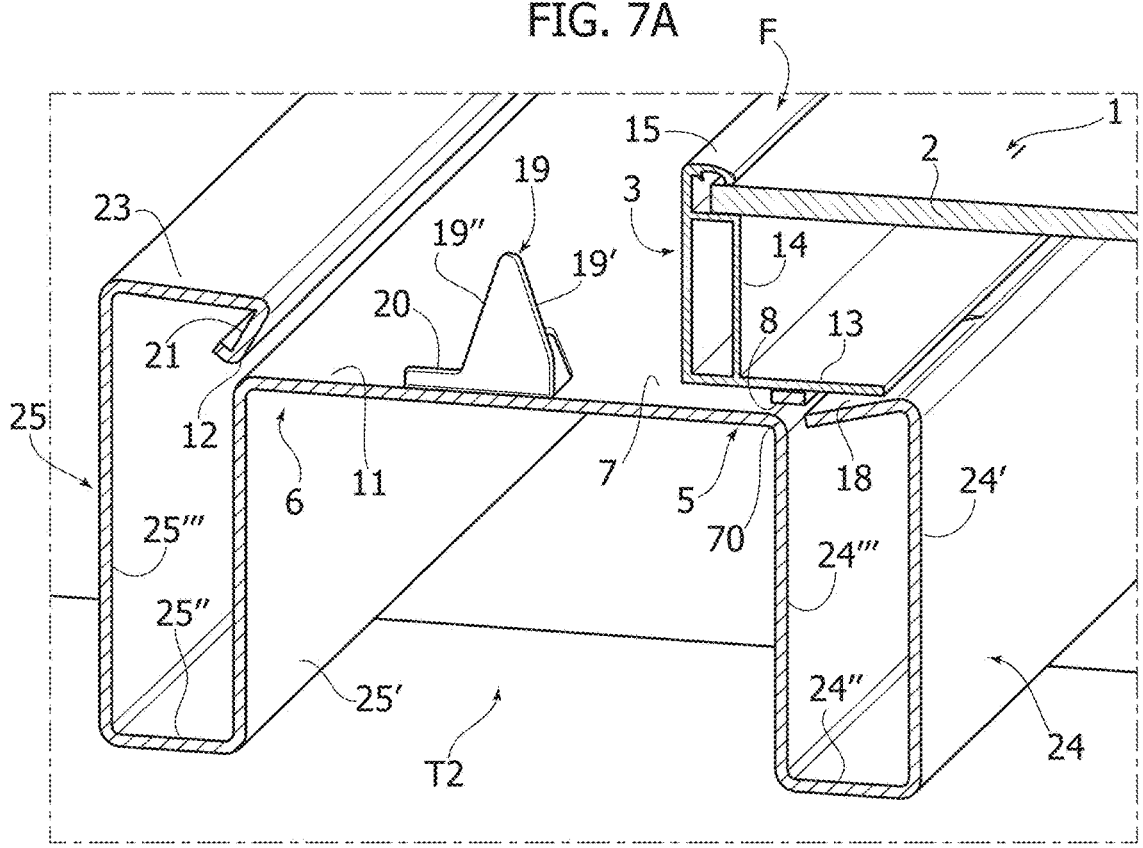
Figure 7B:
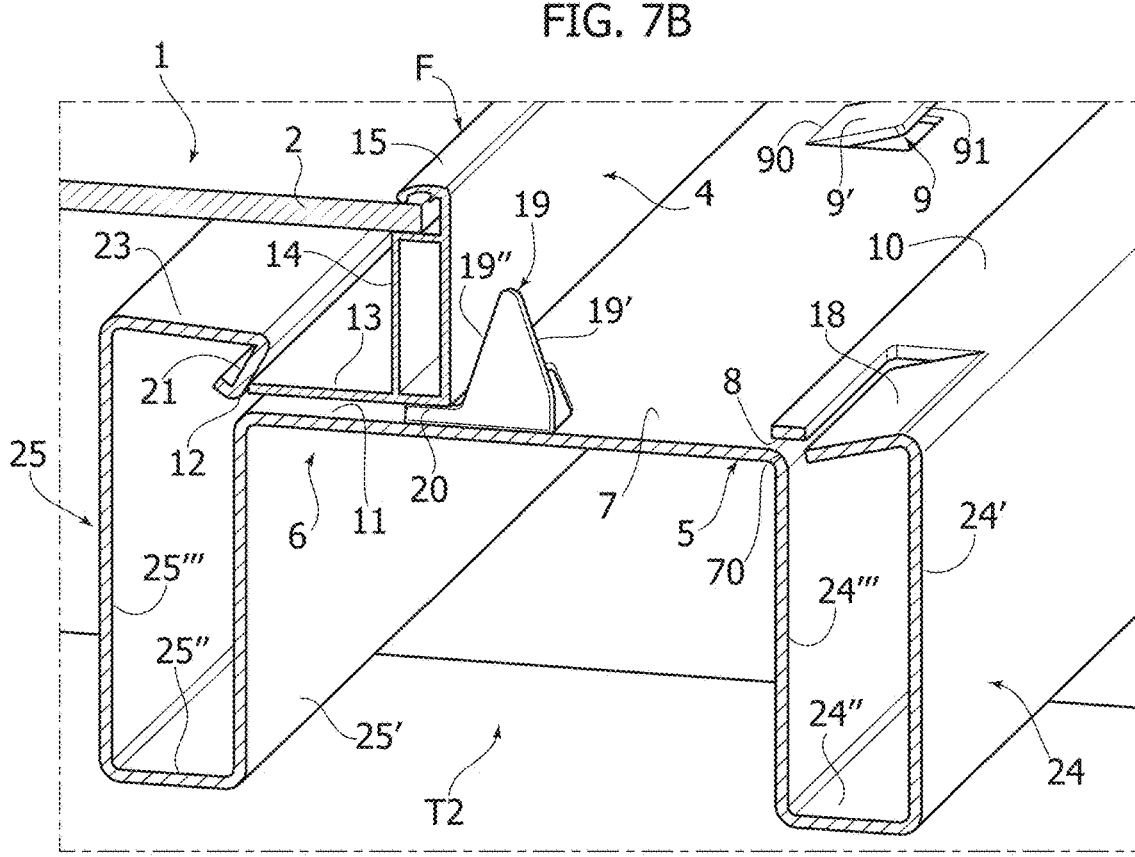
Figure 7B:
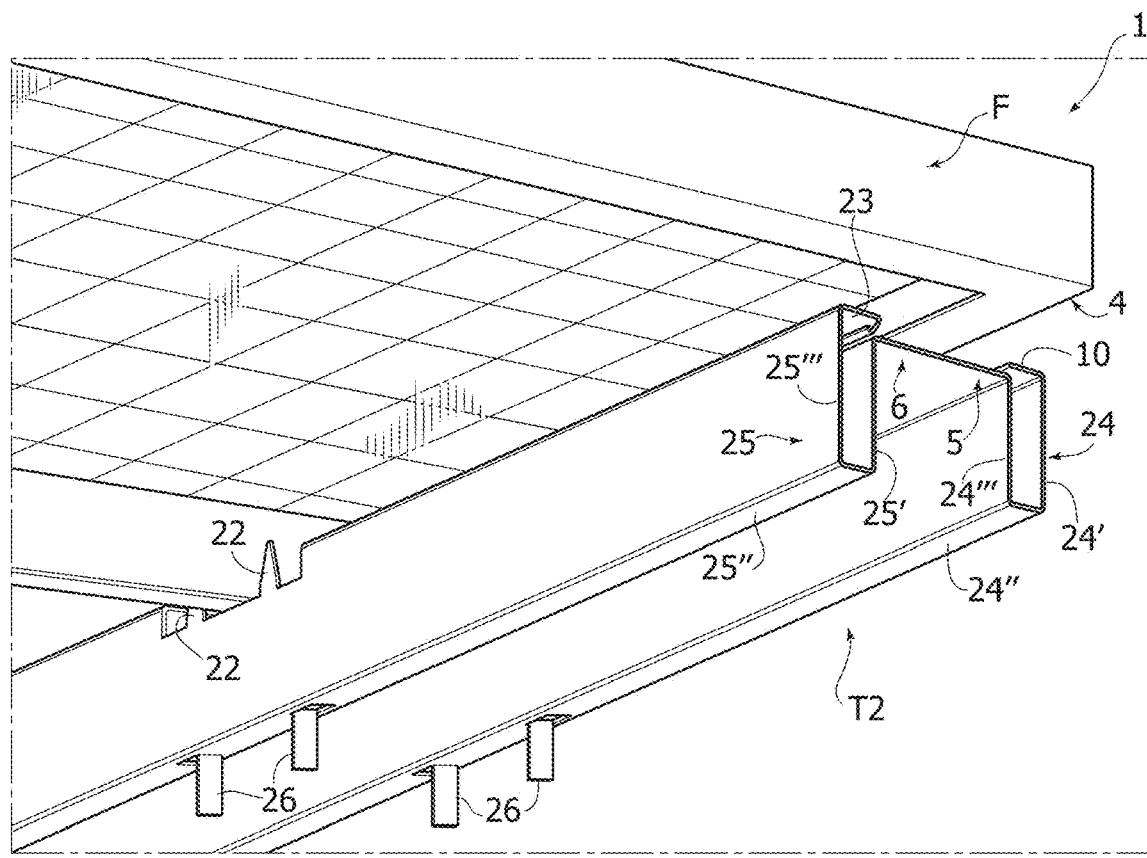

In the step illustrated in FIGS. 6, 7A, and 7B, and as best seen in FIGS. 6A-6C, the panel 1 is brought closer to the alpha cross member T2A and the beta cross member T2B with a first movement of lowering from above downwards, in the direction of the alpha cross member T2A and the beta cross member T2B, according to a rectilinear trajectory substantially orthogonal to the supporting surface defined by the main walls 7, 11 (direction z). In FIGS. 7A and 7B, the solar panel 1 has reached the cross members T2; in particular, the base walls 13 of the first portion 3 and of the second portion 4 of frame F are respectively in contact with the horizontal end wall 10 (FIG. 7A) and the base step 20 (FIG. 7B) of the cross members T2. The base step 20 and the wall 10 are vertically aligned in such a way that, when the panel 1 is positioned on the cross members, it is stably positioned with the photovoltaic layer 2 parallel to the plane defined by directions xy.

FIG. 7B' is a further perspective view of the panel 1, viewed from the side of the second portion 4 of frame F, where it may be seen that the panel 1 is blocked (along a side perpendicular to the portions 3 and 4 of frame F) between the aforesaid auxiliary contrast members 22, 22', provided for blocking the panels on the structure S along the longitudinal axis of the cross members T2 (direction y).

Figure 8A:
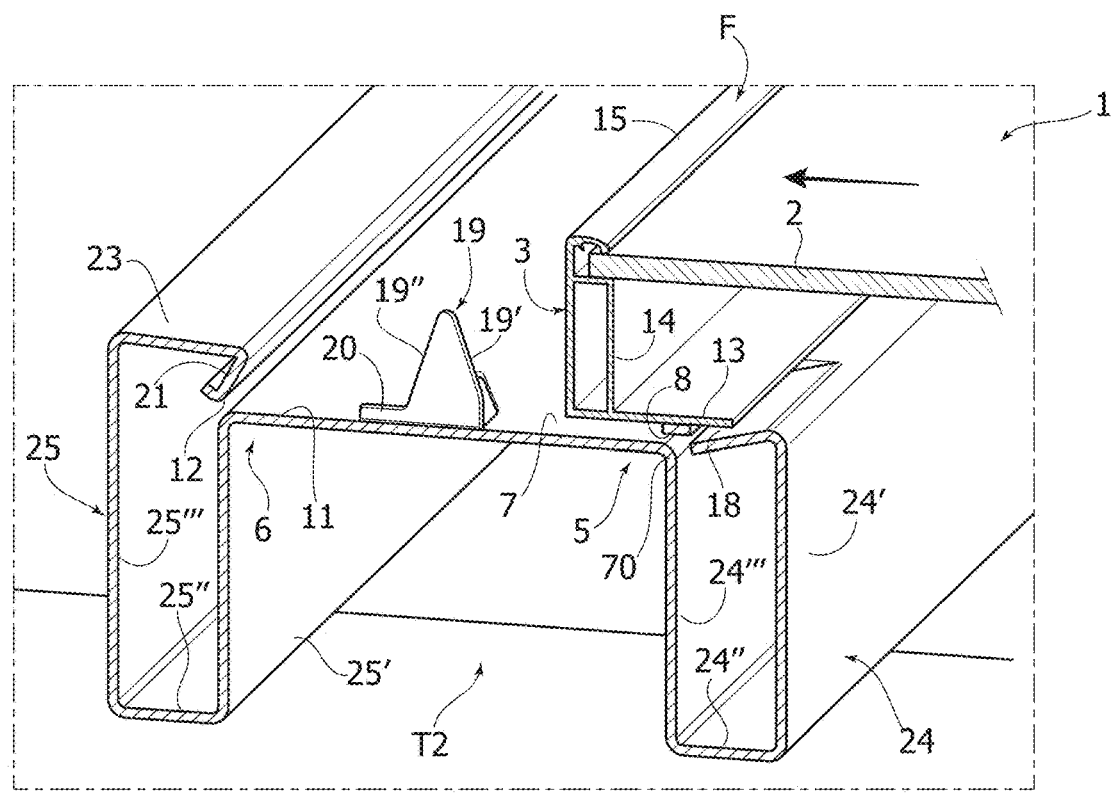
Figure 8B:
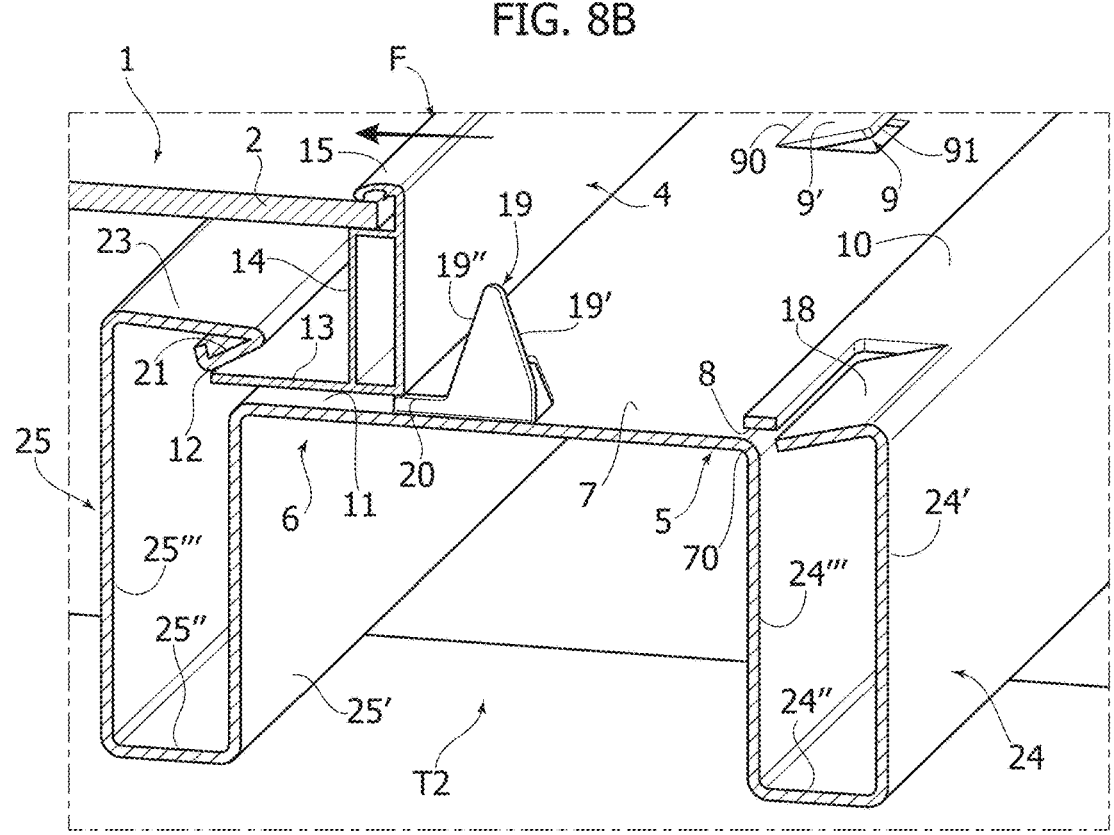

According to what is illustrated in FIGS. 6B, 8A, and 8B, the next step of the method of installation envisages a second movement of the panel 1 according to a horizontal trajectory (in direction x) substantially perpendicular to the first movement (direction z), towards the central projecting element 19 of the first cross member T2. This second movement will lead to bending of the elastic blocking tooth 9 (by means of the first portion 3 of the frame F) in its lowered position (FIG. 8A) and to folding of the folding arm 21 by means of the second portion 4 of frame F (FIG. 8B).

As the above second movement (direction x) continues, the method envisages a further movement of vertical lowering of the panel 1, when the second portion 4 of frame F is no longer able to rest against the base step 20 and the first portion 3 of frame F is no longer able to rest against the horizontal end wall 10. This further lowering movement brings said first and second portions 3 and 4 of the frame F to rest on the main walls 7, 11 of the first and second cross members T2.

According to a subsequent step of the method, the aforesaid second movement is completed when the first portion 3 of frame F rests against the central projecting element 19 (FIGS. 6C, 9A, 9B). In this condition, the base wall 13 bends the elastic blocking tooth 9 into its lowered position in such a way that the tooth 9 is set within a corresponding opening provided on the main wall 7.

Next as best seen in FIG. 6C, the method envisages a further horizontal movement (once again in the direction x) in the opposite direction with respect to said second movement until the second portion 4 of frame F comes to rest against the base step 20 (FIG. 10B). In this condition, the elastic tooth 9 elastically returns into the raised position, and the first portion 3 is blocked between the raised tooth 9 and the end recess 8 defined between the wall 10 and the inclined portion 18 (FIG. 10A). It will thus be appreciated that, at the end of the aforesaid further horizontal movement, the first and second portions 3 and 4 of the frame F of the panel 1 are blocked, respectively, on the portion 5 of the first or alpha cross member T2A and on the portion 6 of the second or beta cross member T2B, thus obtaining the final configuration of installation illustrated at an enlarged scale in FIGS. 10A and 10B. It should be noted how the panel 1 is blocked stably on the structure S, thus preventing movement thereof:

along the axis of the cross members T2 (direction y) thanks to the action of the contrast members 22, 22';

in a horizontal direction perpendicular to the axis of the cross members T2 (direction x) thanks to the action of the elastic blocking teeth 9; and in a vertical direction (direction z) thanks to the action of the end seat 12 and of the end portion 8.

As emerges from the foregoing description, the system according to the invention hence presents a series of undoubted advantages, namely:

the system of connection of the solar panels 1 to the supporting structure S guarantees a total stability of the panels on the structure;

the system of photovoltaic solar panels is simple to build and presents high structural strength, low cost, and high efficiency;

the system of photovoltaic solar panels renders the operations of installation extremely simple and fast; and the system of photovoltaic solar panels according to the invention defines a corresponding method of installation that is completely automated and easy to control from a remote-control station.

Of course, without prejudice to the principle of the invention, the details of construction and the embodiments may vary widely with respect to what has been described and illustrated herein purely by way of example, without thereby departing from the scope of the present invention as defined in the annexed claims.

The invention claimed is:

1. A system of photovoltaic solar panels provided for being mounted on a ground in an open space, comprising:
a plurality of photovoltaic solar panels and a supporting structure configured to support said plurality of photovoltaic solar panels in a number of rows parallel to one another on the supporting structure, each photovoltaic solar panel of the plurality of photovoltaic solar panels comprising a frame including a first frame portion and a second frame portion respectively mounted along a first side and a second side of a photovoltaic layer;
said supporting structure comprising a series of cross members including at least an alpha cross member and a beta cross member arranged parallel to one another and at a distance apart from one another, each of the alpha cross member and the beta cross member including a first cross member and a second cross member configured differently than the first cross member, the first cross member and the second cross member configured for engaging and blocking at least one of the first frame portion or the second frame portion of at least one of the plurality of photovoltaic solar panels extending between the alpha cross member and the beta cross member without requiring manual positional adjustment of the first cross member and the second cross member,
wherein each of the alpha cross member and the beta cross member comprises a single piece of sheet metal configured to receive and engage respective of the at least one of the first frame portion or the second frame portion,
wherein the first cross member is configured to block said respective first frame portion of the photovoltaic solar panel, wherein said first cross member comprises:
a main supporting wall substantially parallel to the photovoltaic layer, configured to receive and support said first frame portion;
a horizontal end wall oriented substantially parallel to and positioned vertically above at a distance from the main supporting wall and connected to the main supporting wall configured to receive an end of said first frame portion, the horizontal end wall including an end portion and an inclined portion, the inclined portion configured as a unitary cut out of the horizontal end wall extending laterally inward and downward at an angle toward the main supporting wall; and
at least one elastic blocking tooth, located on said main supporting wall and positioned at a distance apart from said end portion, the at least one elastic blocking tooth is oriented in a raised position in a condition where the respective photovoltaic solar panel is installed on the first cross member, wherein the at least one elastic blocking tooth further comprises:
a main face oriented oblique with respect to the main supporting wall;
a first end connected to said main supporting wall; and
a second end, said second end configured to abuttingly engage an outer face of said first frame portion in such a way that said first frame portion rests on said main supporting wall and is blocked between said inclined portion and said second end of the elastic blocking tooth, wherein said photovoltaic solar panel is lockingly constrained along an x-direction relative to said first cross member of said alpha cross member and said second cross member of said beta cross member when said photovoltaic solar panel is in a final installation position.

2. The system of photovoltaic solar panels according to claim 1, wherein said first frame portion and said second frame portion are symmetrical with respect to a center line of the photovoltaic solar panel, each of the first frame portion and the second frame portion further comprising:
a top portion defining a seat configured to receive a respective edge of the photovoltaic layer;
a vertical wall extending downwards from the top portion; and
a base wall oriented parallel to and positioned at a distance from the photovoltaic layer, which defines a connection flange for blocking the respective side of the photovoltaic solar panel to the respective cross member.

3. The system of photovoltaic solar panels according to claim 1, wherein said at least one elastic blocking tooth is configured to be biased by a force of the respective photovoltaic solar panel from the raised position to a lowered position into a corresponding opening defined by the main supporting wall, prior to the respective photovoltaic solar panel being positioned to the final installation position, wherein on removal of the force of the respective photovoltaic solar panel the at least one elastic blocking tooth returns to the raised position and the respective photovoltaic solar panel is locklingly constrained in the x-direction on the first cross member.

4. The system of photovoltaic solar panels according to claim 1, wherein the at least one elastic blocking tooth comprises a plurality of said elastic blocking teeth, arranged spaced apart from one another and aligned with one another along a main extension of the first cross member.

5. The system of photovoltaic solar panels according to claim 1, wherein the second cross member further comprising:
a main supporting wall substantially parallel to the photovoltaic layer configured to receive and support said second frame portion;
an end seat associated to said main supporting wall of the second cross member, the end seat configured to receive an end portion of said second frame portion, wherein said main supporting wall of the second cross member and said end seat are configured to receive and block said second frame portion of the respective photovoltaic solar panel,
wherein said photovoltaic solar panel received is secured on the supporting structure along said first frame portion to a respective first cross member of the alpha cross member and along said second frame portion to a respective second cross member of the beta cross member.

6. The system of photovoltaic solar panels according to claim 5, wherein said second cross member further comprises:
a substantially horizontal wall extending inward in an x-direction perpendicular to a main extension of the second cross member, the substantially horizontal wall is unitary with the main supporting wall and positioned vertically at a distance from the main supporting wall of the second cross member; and a folding arm connected to and unitary with the substantially horizontal wall and extending toward the main supporting wall of the second cross member, the end seat is positioned at a distal end of the folding arm and defining a space between the end seat and the main supporting wall of the second cross member, wherein said folding arm is configured to fold during installation of the photovoltaic solar panel, along said second side of said photovoltaic panel, on said second cross member.

7. The system of photovoltaic solar panels according to claim 5, wherein the plurality of photovoltaic solar panels comprise a first photovoltaic solar panel and a second photovoltaic solar panel, each of the first photovoltaic solar panel and the second photovoltaic solar panel including the first side and the second side of the respective frame, wherein the first cross member is configured to support the first side of the first photovoltaic solar panel and the second cross member is configured to support the second side of the second photovoltaic solar panel in such a way as to form a row of photovoltaic solar panels including the first photovoltaic solar panel and the second photovoltaic solar panel that are adjacent to one another and define a substantially continuous photovoltaic layer.

8. The system of photovoltaic solar panels according to claim 7, wherein said each of the alpha cross member and the beta cross member of the series of cross members further comprising a plurality of auxiliary contrast members configured to guide respective of the plurality of photovoltaic solar panels during installation and blocking them on the respective first cross member or the second cross member in a longitudinal direction corresponding to a main extension of the cross member.

9. The system of photovoltaic solar panels according to claim 7, wherein each of the alpha cross member and the beta cross member of the series of cross members further comprises at least one central projecting element, vertically projecting from the main supporting wall of the first cross member and the main supporting wall of the second cross member, the at least one central projecting element is positioned between the first photovoltaic solar panel and the second photovoltaic solar panel when the first photovoltaic solar panel and the second photovoltaic panel are in the final installation position and blocked by the respective first cross member.

10. The system of photovoltaic solar panels according to claim 9, wherein the at least one central projecting element comprises a plurality of said central projecting elements, arranged spaced apart from one another and aligned with one another along a main extension of said first cross member and said second cross member.

11. The system of photovoltaic solar panels according to claim 9, wherein said at least one central projecting element further comprises a first inclined guiding surface configured to guide the respective first photovoltaic solar panel or the second photovoltaic solar panel during installation toward the final installation position wherein said first side of the respective first photovoltaic solar panel or the second photovoltaic solar panel is blocked between said inclined portion and said second end of the at least one elastic blocking tooth.

12. The system of photovoltaic solar panels according to claim 11, wherein said central projecting element further comprises a second inclined guiding surface configured to guide the respective first photovoltaic solar panel or the second photovoltaic solar panel during installation toward the final installation position wherein said second side of the respective first photovoltaic solar panel or the second photovoltaic solar panel is blocked between said central projecting element and said end seat.

13. A system of photovoltaic solar panels provided for being mounted on a ground in an open space, comprising:
a plurality of photovoltaic solar panels and a supporting structure configured to support said plurality of photovoltaic solar panels in a number of rows parallel to one another on the supporting structure;
the plurality of photovoltaic solar panels comprising a first photovoltaic solar panel and a second photovoltaic solar panel, each including a frame comprising a first frame portion and a second frame portion respectively mounted along a first side and a second side of a photovoltaic layer of the respective first photovoltaic solar panel and the second photovoltaic solar panel;
said supporting structure including a series of cross members including at least an alpha cross member and a beta cross member arranged parallel to one another and at a distance apart from one another, each alpha cross member and beta cross member including a first cross member configured to support the first side of the first photovoltaic solar panel or the second photovoltaic solar panel and a second cross member configured to support the second side of the first photovoltaic solar panel or the second photovoltaic solar panel in such a way as to form a row of photovoltaic solar panels including the first photovoltaic solar panel and the second photovoltaic solar panel that are adjacent to one another and define a substantially continuous photovoltaic layer wherein each alpha cross member and beta cross member comprises a single piece of sheet metal bent so as to perform functions of centering, referencing, and blocking said first photovoltaic solar panel and the second photovoltaic solar panel respectively extending between the alpha cross member and the beta cross member, without aid of further fixing elements;
wherein each said first cross member is further provided for blocking said first frame portion of the respective first photovoltaic solar panel or the second photovoltaic solar panel, wherein each said first cross member comprises:
a main supporting wall substantially parallel to the photovoltaic layer configured to receive and support said first frame portion;
an end portion configured to receive an end of said first frame portion; and
at least one elastic blocking tooth, located on said main supporting wall and positioned at a distance apart from said end portion, the at least one elastic blocking tooth is oriented in a raised position in a condition where the respective photovoltaic solar panel is installed on the first cross member, wherein the at least one elastic blocking tooth further comprises:
a main face oriented oblique with respect to the main supporting wall;
a first end connected to said main supporting wall; and
a second end, said second end acting as an element of contrast against a side of said first frame portion in such a way that said first frame portion rests on said main supporting wall and is blocked between said end portion and said at least one elastic blocking tooth, wherein said respective photovoltaic solar panel is constrained along said first frame portion to said first cross member;

wherein each said second cross member further comprising:
   a main supporting wall substantially parallel to the photovoltaic layer configured to receive and support said second frame portion;
   an end seat associated to said main supporting wall of the second cross member, the end seat configured to receive an end portion of said second frame portion, wherein said main supporting wall of the second cross member and said end seat are configured to receive and block said second frame portion of the respective photovoltaic solar panel, wherein said photovoltaic solar panel received is secured on the supporting structure along said first side to a respective first cross member and along said second side to a respective second cross member;
each of the alpha cross member and the beta cross member further comprises at least one central projecting element vertically projecting from the main supporting wall of the first cross member and the main supporting wall of the second cross member, the at least one central projecting element is positioned between the first photovoltaic solar panel and the second photovoltaic solar panel when the respective first photovoltaic solar panel and the second photovoltaic panel are in a final installation position on one of the alpha cross member or the beta cross member and blocked by the respective first cross member, each central projecting element further comprising:
   a first inclined guiding surface configured to guide the respective first photovoltaic solar panel or the second photovoltaic solar panel during installation toward its final installation position wherein said first side of the respective first photovoltaic solar panel or the second photovoltaic solar panel is blocked between said end portion and said at least one elastic blocking tooth;
   a second inclined guiding surface configured to guide the respective first photovoltaic solar panel or the second photovoltaic solar panel during installation toward its final installation position wherein said second side of the respective first photovoltaic solar panel or the second photovoltaic solar panel is blocked between said central projecting element and said end seat; and
   a base step, positioned adjacent to the main supporting wall of the second cross member, at an end of said second inclined surface, wherein when the respective first photovoltaic solar panel or the second photovoltaic solar panel is positioned in the final installation position, said second side of the respective first photovoltaic solar panel or the second photovoltaic solar panel is blocked between the base step and the end seat.

\* \* \* \* \*